(12) United States Patent
Kashyap

(10) Patent No.: US 6,871,296 B2
(45) Date of Patent: Mar. 22, 2005

(54) HIGHLY AVAILABLE TCP SYSTEMS WITH FAIL OVER CONNECTIONS

(75) Inventor: Vivek Kashyap, Beaverton, OR (US)

(73) Assignee: International Business Machines Corporation, Armonk, NY (US)

( * ) Notice: Subject to any disclaimer, the term of this patent is extended or adjusted under 35 U.S.C. 154(b) by 552 days.

(21) Appl. No.: 09/752,841

(22) Filed: Dec. 29, 2000

(65) Prior Publication Data

US 2002/0087912 A1 Jul. 4, 2002

(51) Int. Cl.$^7$ ............................................... G06F 11/00
(52) U.S. Cl. ............................................... 714/13; 709/227
(58) Field of Search ............................ 714/13, 2, 4, 16, 714/43, 44, 56, 20, 39; 709/105, 221, 227, 228

(56) References Cited

U.S. PATENT DOCUMENTS

| | | | | |
|---|---|---|---|---|
| 5,435,003 A | * | 7/1995 | Chng et al. ..................... | 714/4 |
| 5,922,077 A | * | 7/1999 | Espy et al. ...................... | 714/7 |
| 6,006,264 A | * | 12/1999 | Colby et al. ................. | 709/226 |
| 6,108,701 A | * | 8/2000 | Davies et al. ............... | 709/224 |
| 6,119,170 A | * | 9/2000 | Schoffelman et al. ....... | 709/244 |
| 6,292,905 B1 | * | 9/2001 | Wallach et al. ................ | 714/4 |
| 6,601,101 B1 | * | 7/2003 | Lee et al. ................... | 709/227 |

\* cited by examiner

*Primary Examiner*—Dieu-Minh Le
(74) *Attorney, Agent, or Firm*—Law Offices of Michael Dryja; Abdy Raissinia

(57) ABSTRACT

The present invention provides a method, system and apparatus by which TCP connections may be failed-over from one system to another within a highly available network service, and appear transparent to the remote client. The connection state and ownership information of a system is broadcast within the network, so that if a first system crashes while running an application, a predetermined take-over policy causes a peer system to assume connection without loss of data such that a permanent connection has been established from the client's point of view. After the failed system has been restored to a normal state, new connections are established by the first system.

19 Claims, 6 Drawing Sheets

HIGHLY AVAILABLE TCP SYSTEMS WITH FAIL OVER CONNECTIONS

BACKGROUND OF THE INVENTION

1. Technical Field

This invention relates to establishing and maintaining permanent connections between network systems.

2. Description of the Prior Art

Once an application that is running on a system is terminated because the system has crashed, the client will lose its connection, even if another system takes over the IP address. For example, if the server system being used by an airline travel agent crashes while the query is being processed, the agent will have to reconnect and then re-enter the original query request to receive all of the flight alternatives. Presently, such a loss of connection occurs because the server that takes over the application lacks the protocol's connection state. The client will receive a reset from the server that took over the connection because the server does not have the protocol state. This will terminate the correction at the client. From the point of view of the client, there has been a failure requiring the client to reconnect, and possibly reacquire or exchange data that had been already sent. This goes contrary to the stated aim of data centers using clustered systems to provide uninterrupted service.

Prior to the present invention there has been a long felt need for a method of keeping server failures and the resultant failover of TCP connections transparent to the clients, so that although the client, e.g. the travel agent, might notice a small delay, the application would continue without loss of connectivity and data. A TCP service would be considered highly available only if the connection survives server crashes.

SUMMARY OF THE INVENTION

This invention provides a method, system and apparatus by which TCP connections may be failed-over to another system transparently to the client, making the connections highly available. Such failed-over connections are immune to server failures and are thus termed permanent.

A first aspect of the invention is a method for maintaining connections for a failed first system on a network. A second system within the network receives ownership information from the first on which an application is running. When it is determined that the first system is in a failed state, the second system assumes the connection for the first system and preferably but not necessarily continues the application from the point at which the first system failed.

A second aspect of the invention is a system for maintaining a connection within a network. The system includes means for broadcasting ownership information between the first system and a second system, and means for determining that the second system will assume connections for the first system if the first fails. The system further includes means for determining that the first system is in a failed state, means for transmitting to the second system packets sent to and received by the first system, and means for continuing the application on the second system from the point at which the first system failed.

A third aspect of the invention is an article for maintaining connections for a first system in a failed state within the network. A computer readable signal bearing medium carries means for receiving ownership information from the first system, and means for determining by a second system that the first system is in the failed state. Means in the medium assume a connection for the first system, and preferably but not necessarily continue the application on the second system from the point at which the first system failed.

Other features and advantages of this invention will become apparent from the following detailed description of the presently preferred embodiment of the invention, taken in conjunction with the accompanying drawings.

DESCRIPTION OF THE PREFERRED EMBODIMENT

Overview

Figure 1A:
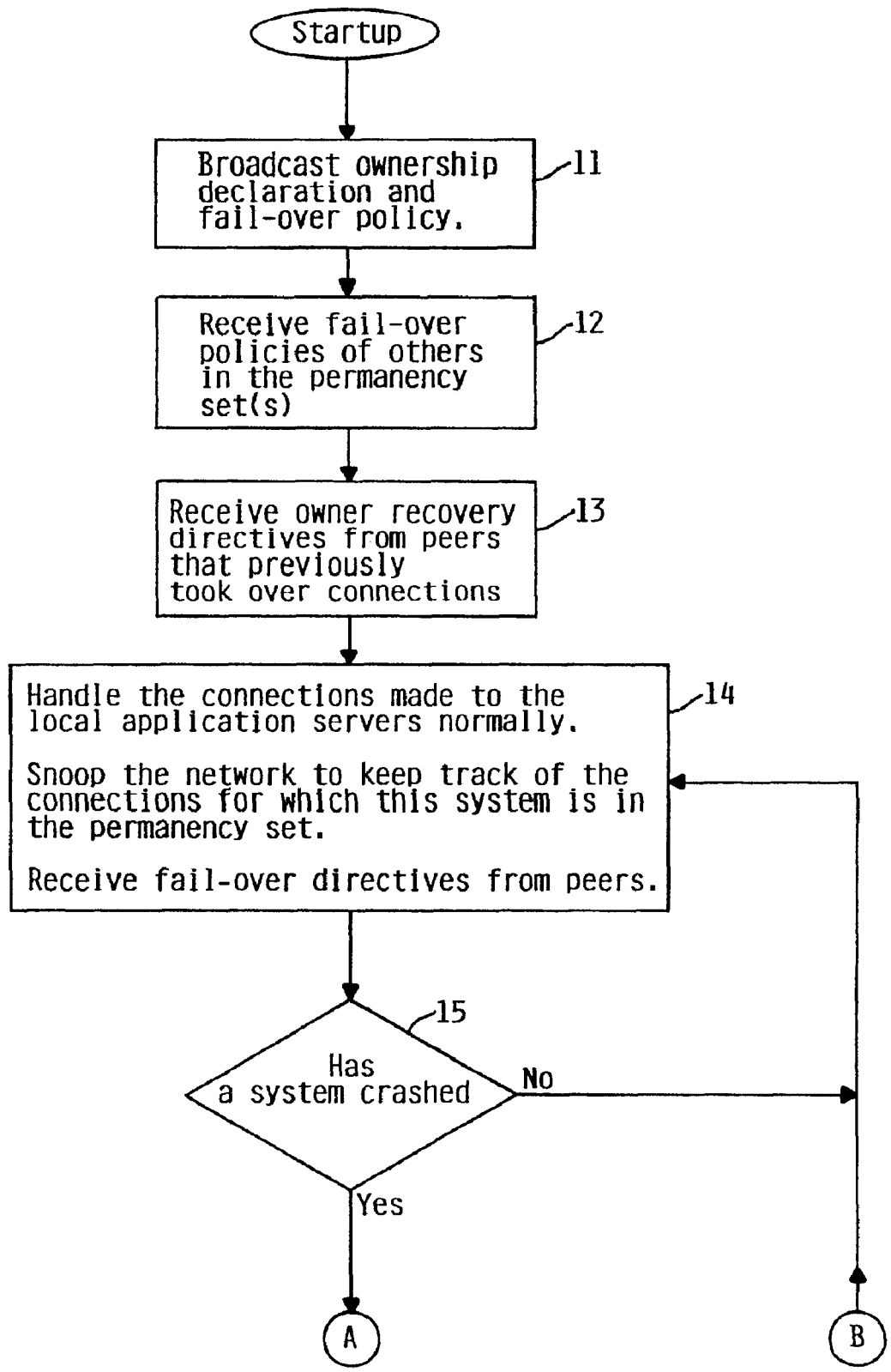
FIGS. 1A and 1B are flowcharts showing a method according to the preferred embodiment of this invention.

A method, system and apparatus are provided by which highly available service comprises a set of TCP systems with facility for failing over connections among the peer systems without the loss of connectivity or data. The failover is accomplished in a way that is transparent to the client and is permanent since the connection is not lost even if the server hosting it crashes.

Technical Background
Concepts and Definitions

The following is a set of concepts that will be used throughout this description of the preferred embodiment. Unless noted otherwise, the term "system" is used to refer to one or more servers, and the term "peer" refers to other servers, as opposed to indicating a similarity of system features, types or performances.

1. Fail-Over

In accordance with the present invention, if the system handling a connection crashes, another system within the network will take over the connection. The system taking over the connection is said to belong to the 'permanency set' for the connection. The systems that can take over the connection are called 'permanency peers' to the original system with respect to the connection. It is possible for a system to belong to a permanency set of a particular connection, but not to other connections. A system may at the same time, belong to multiple permanency sets. The system originally handling the connection is said to be the 'owner' of the connection or 'binding.' A "binding" refers to the collection of local/foreign IP address and local/foreign port number and the protocol. In a preferred embodiment of the present invention the protocol is TCP.

At startup, each system configured to take part in implementing a permanent TCP connection configuration broadcasts its IP address and port range for which it needs a permanency set. Each system also broadcasts a 'fail-over policy' that determines which of the permanency peers will actually take over the connection in case of a failure.

2. State Transfer

The state of the TCP connection, i.e., data in the window, the acknowledgement and sequence numbers, the local and foreign port number and IP address etc., is actively captured by the systems that are part of the permanency set. The state transfer is achieved by all of the members of the permanency set that are merely listening to the data transfer on the connection. Thus, there is no need or attempt to actively transfer the state between systems.

3. Address Ownership

The address ownership is defined in terms of IP address, protocol, and port range, and is tied to a unique cluster wide ID. Ownership can be tied to any unique ID on the system, such as the Ethernet address of one of the cards on the system, an IP address that is not shared, or the cluster-node ID of the system. The invention uses the cluster-node ID to distinguish between the systems. A system may own multiple addresses, and may be in the permanency set of multiple bindings.

4. Endpoint Connectivity at the Server

When a system crash is detected by the systems in the permanency set, one of the permanency peers takes over the connection(s) in accordance with the fail-over policy. Alternatively, some of the connections are taken over by one of the permanency peers and other connections by another peer etc. Which peer will take over a particular connection is specified in the ownership declaration in which the fail-over policy might list the port ranges and the peer systems to take over each listed port. After the peer server has taken over the connection, the relevant application then needs to attach to the endpoint as created in the kernel. This reverses the normal process in the prior art, wherein the application creates a handle (e.g., the file descriptor/socket), that is then used to set up the connection maintained in the kernel. The difference in the present process occurs because the permanency peer has been snooping the connection and therefore has the in-kernel state in place.

Establishing a Permanent TCP Connection

In the preferred embodiment, the servers in the permanency set are in a 'cluster.' Clustered servers share access to a common set of disks. A clustered system uses 'heart-beat' messages to determine when one of the clustered nodes has crashed. Although clustered systems are used in the preferred embodiment, systems connected other than in a cluster also benefit from the invention, so long as: 1) one of the connected systems is able to detect the crash of another; and 2) on the server taking over the connection, the applications are able to recover/restart at the point of the crash. Stateless applications are capable of crash recovery for the purposes of this invention. Additionally, database applications are written with crash recovery requirements in mind. Therefore, similar applications would need little, if any, modification in order to utilize the benefits of the present invention.

Figure 1B:
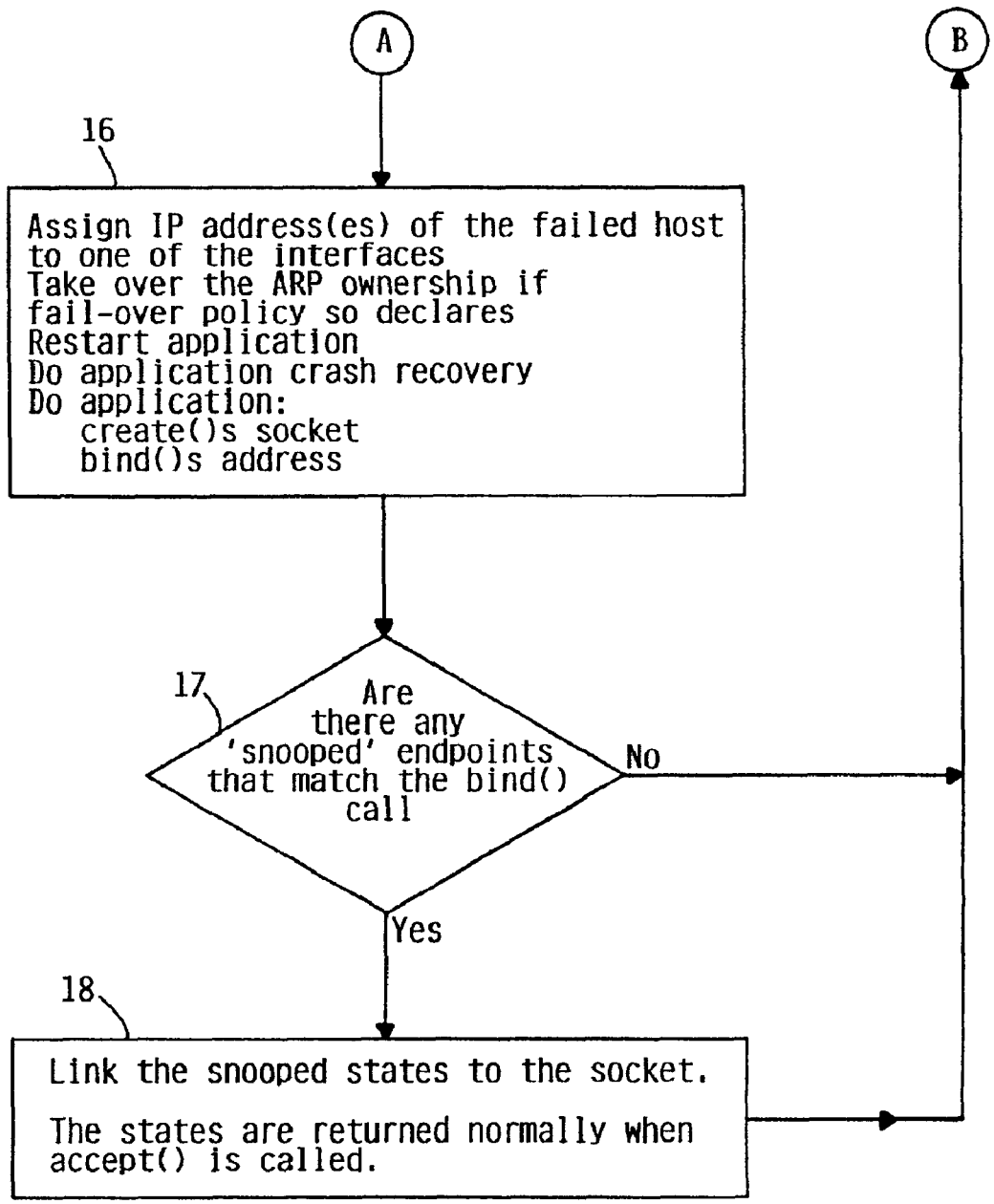
Figure 2:
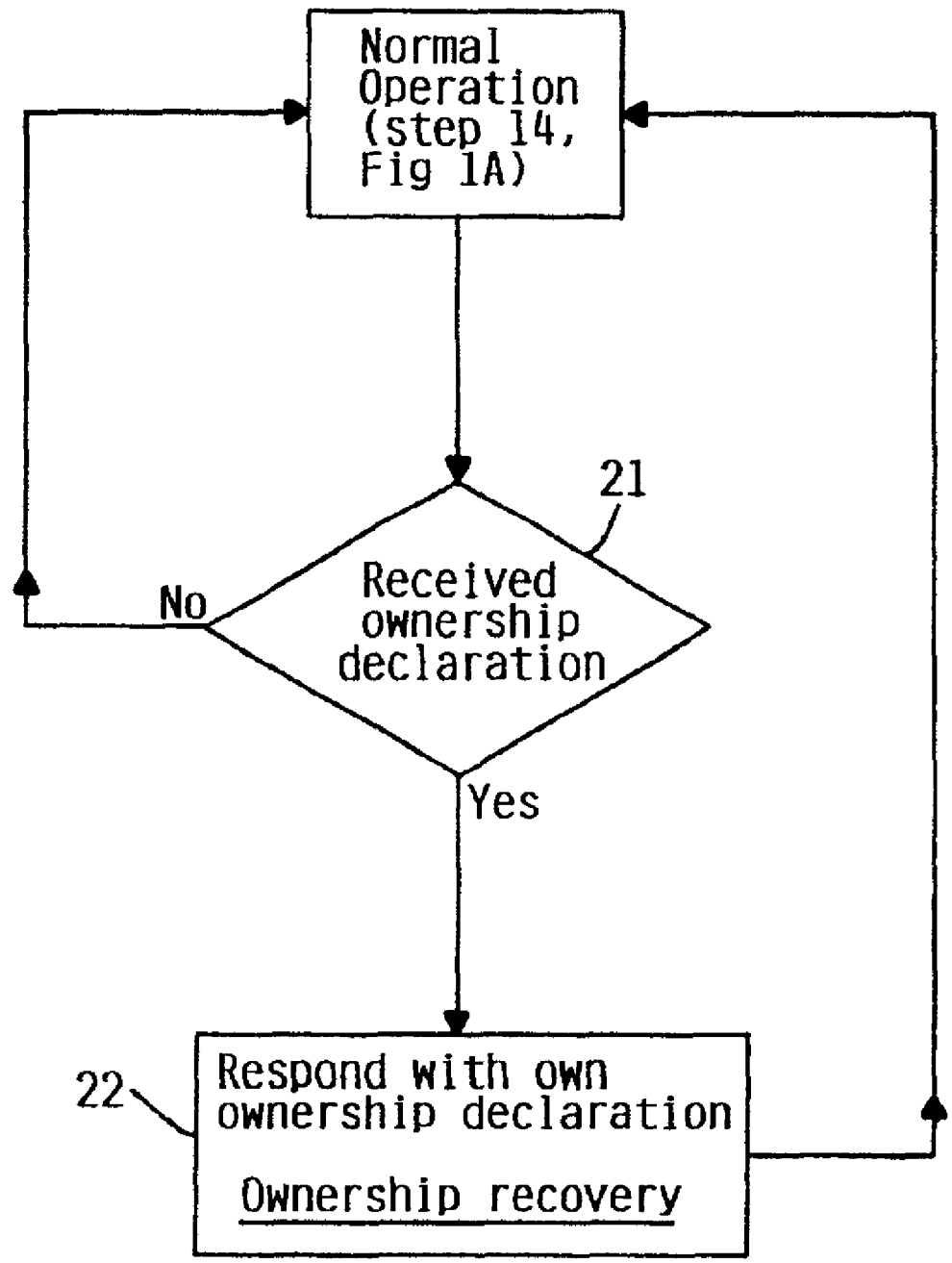
FIGS. 2 and 3 are flowcharts showing alternative embodiments of the invention.

FIGS. 1A and 1B show the process for creating and maintaining permanent connections. After startup, each server broadcasts ownership information to the other servers in the cluster, step 11. The ownership information comprises:

The IP (Internet Protocol) address(es) it owns;
the MAC (Media Access Control) address(es) tied to the IP address(es);
the port numbers range it wants taken over;
the protocol, which is preferably, but not necessarily, TCP (Transmission Control Protocol);
the policy by which the permanency peers decide the system that will take over the connection (fail-over policy);
the policy to determine the system that will pick up the ARP (Address Resolution Protocol) ownership (fail-over policy);
the application(s) that need(s) to run; and
the cluster-node ID.

This information, collectively referred to as the "ownership declaration," is transmitted at every boot of the system. All of the systems that are already 'up' in the cluster receive the ownership declaration, and reply with their own ownership declaration, step 12. Alternatively, the reply messages may be unicast to the soliciting system, or a "solicit request" bit may be set in the ownership declaration packet.

During normal operation of the system, step 14, the system snoops the network to keep track of connections within the permanency set. It also might receive failover directives transferring ownership back to it.

Fail-Over Policy: It is the fail-over policy in the preferred embodiment that the system with the numerically smallest cluster-node ID takes over. Alternatively, the master node in the cluster can designate the owner when a system goes down, or an implementation-specific election algorithm might be implemented.

The permanency peers listen to each other's connections, and receive the data exchanged on the connection. The peers keep one window size of send and receive data, and the TCP endpoint state as it exists on the system that is currently handling the connection. When the server determines failure of a permanency peer, step 15, and the policy dictates that it is the one that needs to takeover the connection, step 16, the server performs the steps shown in FIG. 1B.

As seen in FIG. 1B, first, the application is restarted, if necessary. Then the application does its crash recovery. The system must fail-over the IP address that was owned by the failed system. A system might have to fail-over multiple addresses, or the policy might designate different servers for different IP addresses. The IP address is simply assigned to the interface that was being used to 'snoop' the connection packets. Alternatively, the IP address(es) may be assigned during configuration when it is decided that the address is needed to snoop the packets.

The application (through a subroutine) creates a socket to be used for the connection it wants to takeover, and (through another subroutine) binds the address to which it wants to listen. For easy representation of the concepts this document discusses the invention in terms of the BSD sockets implementation found on most unix systems, although it will be understood that other operating systems will benefit equally from the invention. The application might already be running on the system and be bound to INADDR_ANY on the port. For such cases, bind( ) is called with the specific IP address and the port that is being taken over.

At step 17, connection state might have been created in response to receiving connection information by snooping the fabric. Flags on the connection state determine whether the call must fail or succeed, depending on whether the 'owner' of the binding has crashed. These flags are modified when the cluster software determines that the owner has crashed and that the connection will be taken over by this node. Thus, a bind( ) request will fail if the connection state indicates that the original owner is still active. Note that from the point of view of the system, the owner is the system handling the connection at a given time. However, the system owning the connection at the time need not be the original owner of the connection.

At step 18, the application then calls the subroutine to listen. Although there might have been multiple connections with the specific local port and the address that were being handled by the system that has gone down, listen( ) determines if there are any 'snooped' TCP saved endpoints that would be legitimate connections on the previous bind( ). If so, these endpoints are all linked to the socket. When the application calls the subroutine accept( ), the connections are normally returned back to the user. Thus, the accept( ) call does not have to change.

Snooping of Connections

Referring again to FIG. 1A, To successfully "snoop" or monitor connections, step 14, the permanency set must receive both the packets sent by the owner system and the packets received by the owner system. In the preferred embodiment, a separate fabric is not needed to separately exchange the state or packets to the permanency peers. This is because such a scheme introduces extra complexity and increases the chances of lost data updates.

Two additional conditions are desirable, although not essential to the preferred embodiment. However, both of these conditions are easily met. First, the system in the permanency set must not be overloaded by the snooping task. Second, the data link must not be overloaded with extra packets.

Cluster Configuration

Figure 4:
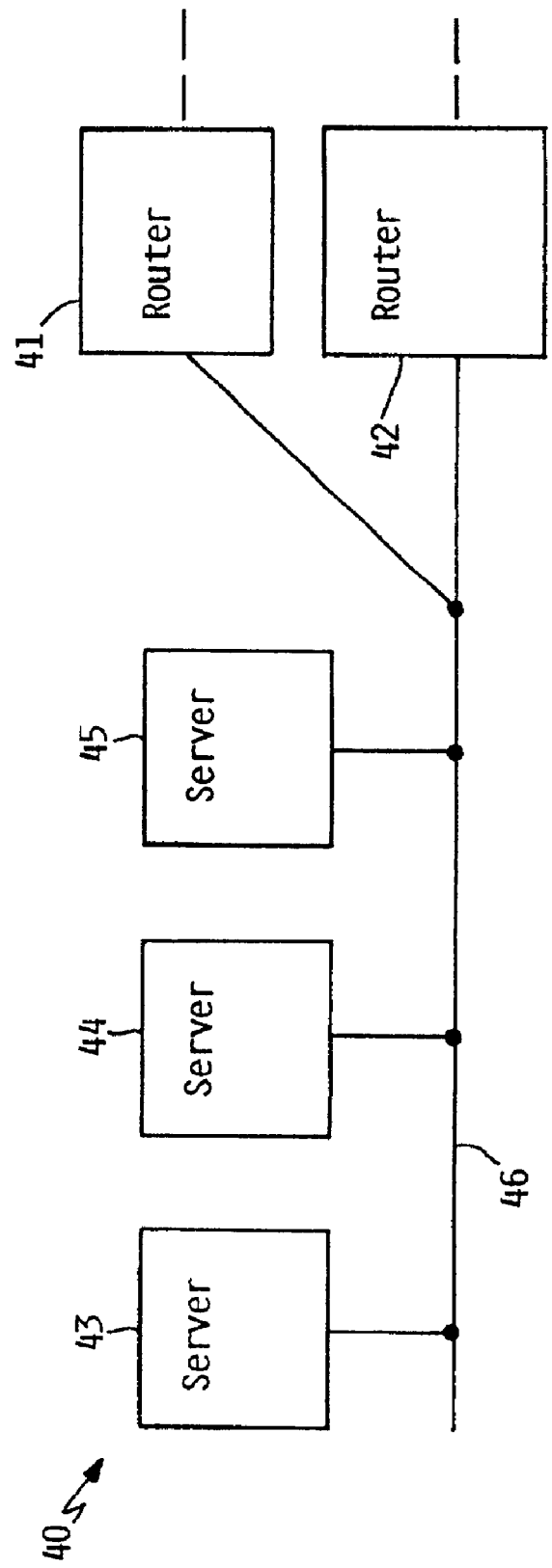
FIG. 4 is a second configuration that allows servers within a network to receive all packets.

As shown in FIG. 4, the systems in the cluster talk to the external world through a router. In the preferred embodiment, for redundancy, there are multiple routers 41,42 serving the servers 43,44,45 of the cluster 40. For the permanency peers 43,44,45 to snoop the connections, the basic requirement is that all the packets to and from the router 41,42 reach all the systems 43,44,45. This can be configured on a case-by-case basis. A single link 46 is set up, and link-level multicast addresses are used. Alternatively two sets of link-level multicast addresses are used, such that one includes all of the servers 43,44,45 and the other includes every system of the cluster 40, including the servers and the routers 41,42. The IP level addresses used are unicast addresses. Thus the packets on the link 46 are all picked up by the permanency peers 43,44,45 and the router 41,42 since the media device picks up all the packets sent to the multicast addresses.

An alternative configuration for better filtering is to distribute the MAC address of the interface that owns the IP address to all of the other systems in the ownership declaration. All the systems in the permanency set add this MAC address to the list of addresses on which the data link device filters packets. They also add the router's MAC address to this list. Thus, the systems will receive only relevant packets. For this to work the data link must be a broadcast medium.

Figure 5:
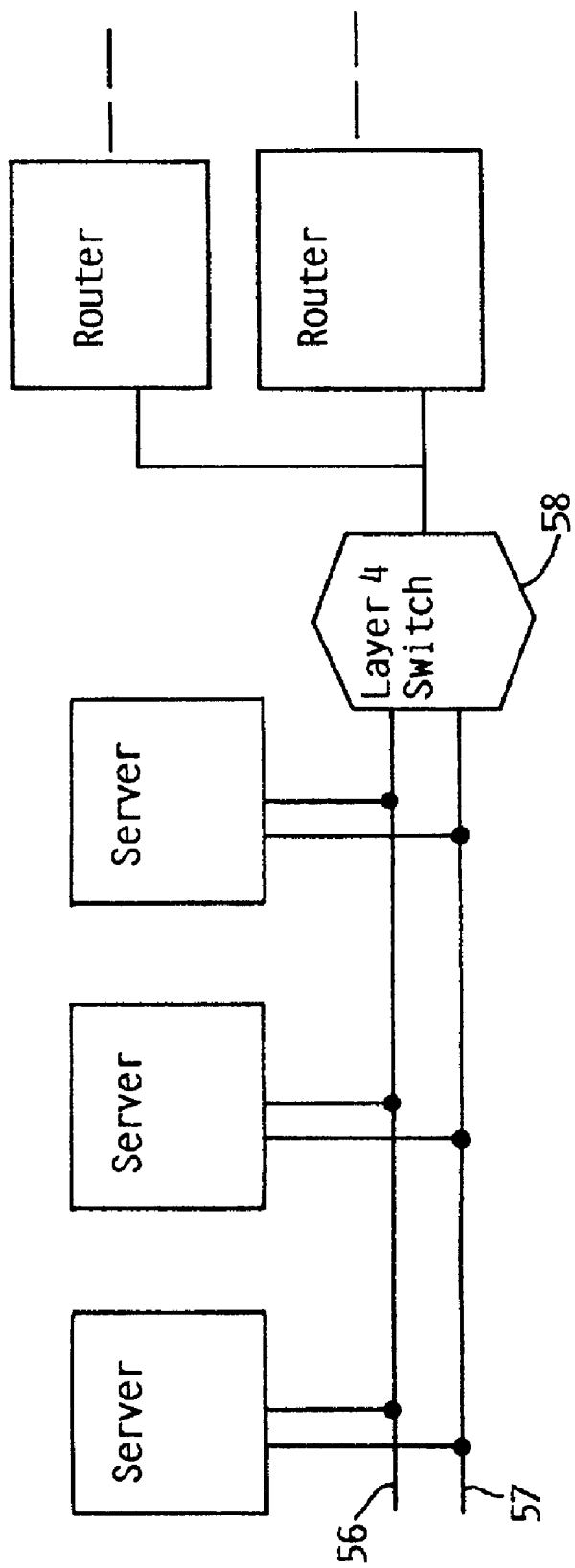
FIG. 5 is an example of a computer-readable signal-bearing medium.

As shown in FIG. 5, if a single data link cannot take the load, multiple links 56, 57 are setup, and a Layer 4 switch 58 directs the packets down the links on which the relevant interfaces of the systems are located.

ARP Owner

Referring again to FIGS. 1A and 1B, the present invention calls for multiple interfaces to listen on the same data link. The owner of an IP address is also the ARP owner. All the permanency peers of a binding, assign the IP address to an interface on the data link. The MAC address of the owner is added to the device's table for receiving packets. However, only the owner handles ARP protocol packets. The remainder of the system, drops ARP packets that are relevant to the IP address. Consequently, in the present invention if the system crashes, another one of the servers, e.g., in the cluster, in accordance with the policy, assumes ARP ownership, step 16. Then, upon receiving the ownership declaration from the original owner the permanency peer returns control of the ARP packets for the IP address, in which case the owner takes over ARP resolution again, step 14.

Keeping the TCP State

The TCP state is needed for the fail-over server to correctly interact with the remote TCP peer. Without this information the server cannot exchange the appropriate set of packets and responses, as determined by the TCP protocol state device. The state also indicates the in-kernel setting used to correctly interact with the application using the connection. The TCP state includes:

state of the TCP state machine for the connection, e.g., SYN_SENT, ESTABLISHED or TIME_WAIT, etc;

maximum segment size (TCP MSS);

options being used, such as timestamp, SACK, window scale, etc;

whether in a persist state, or not;

sequence number of the last segment acknowledged by the remote peer;

sequence number of the next data to send;

initial send sequence number;

send window size;

receive window;

sequence number of the next segment to receive;

initial receive sequence number;

advertised window; scale factor, etc.

Depending on the implementation, the state can alternatively include other implementation-specific information, too.

The permanency peers need not run the complete TCP protocol on the packets they receive. A permanency peer adds the IP address and the local port to the TCP lookup table used to determine if the packet is meant for that peer.

In establishing connection, step 14, a three-way handshake is simulated by way of setting up the connection. The simulation is from the point of view of the permanency peer.

If the source port and address in the packet match the binding being snooped then the connection is being set up by the owner system in the permanency set. A server setting up a connection is highly unlikely however. A new binding is created in the TCP lookup table including the foreign address and port. The SYN packet is attached and kept with the binding. If the destination port and address in the SYN packet match the binding being snooped, the remote client has sent the SYN. In this case too, a new binding is setup, and the SYN packet is stored. On the other hand, if the binding already exists, then depending on the simulation state, the packet is taken as valid or dropped.

If a duplicate SYN is received, the SYN segment may be being repeated because there was no reply. Each duplicate SYN causes the old, stored SYN packet to be discarded. If a SYN from the other end is received, the state of the endpoint is changed, as per the three-way handshake segments. By comparing the SYN received from the other end with the SYN from the original sender, any TCP options setup are recorded. Simultaneous SYN case handling is dictated by which SYN is received first, i.e., the one from the remote client or the owner of the binding. The state changes to ESTABLISHED only when the three-way handshake completes, i.e. the final ACK from the original sender is received.

Once the connection has been established, there is a transfer of data between the endpoints. The endpoints will have applications that drain the data that has been received, although in the case of the snooper, there is no application to drain the data. The snoopers maintain up to a window of data in both directions. The data is purged on the basis of window advertisements and acknowledgements in the data segments that are received.

Terminating the connection, by way of RST or FIN is again simulated, i.e., the TCP engine is run on the endpoint, except that no data is transmitted on the wire. Although there could be a slight mismatch in the timing of the actual close of the endpoint between the permanency peers, this condition is a concern only when the system crashes in the TIME_WAIT state. The solution to this minor discrepancy is managed if the snooper waits for a little more than the standard configured time. It can also terminate the connection immediately if it finds a new connection with the same binding being established.

It is significant that the IP address and the port being backed-up can be either the destination or the source, depending on the sender, for all kinds of TCP packets, e.g., SYN, ACK, data, etc. The permanency peers must keep track of this information.

Clusters are typically setup for load sharing and redundancy purposes. Redundancy implies that the systems are configured in such a way as to permit a take-over of the tasks that were being handled by the crashed system. A particular system in the cluster must, in general, be capable of handling the sum of all connections for which it is the primary owner, and for which it is a back-up. This could potentially cause a slight drop in the efficiency of the tasks performed, but within acceptable limits. The load imposed by tracking the TCP connections owned by other servers is less than that required by handling all the possible connections. The back-up task can be distributed among multiple servers based upon the possible load. With only a slight increase in resources in some cases, conventional configurations can handle the TCP backup load.

Additionally, the following are tasks that are not performed while snooping:

no timers run, except at connection setup and termination;
no data is sent on the data link;
no data is exchanged with the application;
no RTT calculations are performed;
no options are processed;
congestion window calculations or fast recovery, and the like, are not performed;
no data checksum is performed, except for the TCP header checksum; and
no IP options are handled, e.g., source routing.

Other tasks may also be excluded during snooping.

Fail-Over Directive

Figure 3:
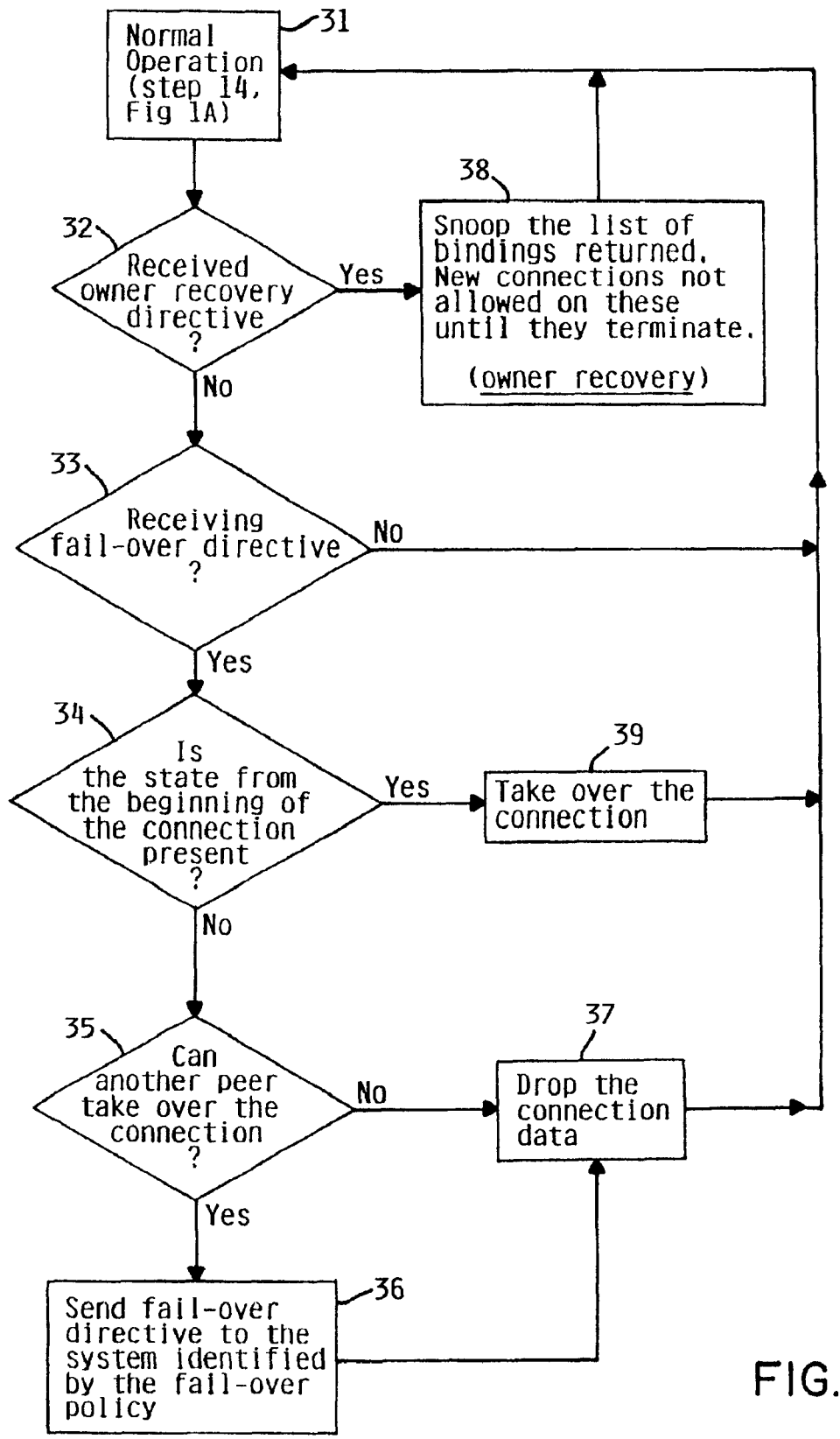

FIG. 3 show a permanency peer's handling of owner recovery directives and fail-over directives.

If the connection being transferred from the failed system to a permanency peer is in an idle state, with no data being exchanged, there would be nothing for the peer to snoop and the fail-over will not succeed. Additionally, if the connection is not snooped during set-up, it would be difficult to determine all the options used (such as window scale) or the MSS advertised by the other end based on data samples. In light of both of these conditions, the permanency peer taking over is required to have snooped the connection from the establishment of that connection, step 38. If that peer system does not have the necessary information, it cannot take is over the connection from the failed system, and it instead sends a packet (called the "fail-over directive") to a second permanency peer in the cluster step 36 or network. The second peer is the system that would take over if the first permanent peer crashed. The first permanency peer then drops the 4 tuple (local port/address and foreign port/address) binding this connection from its lookup table, step 37.

Upon receiving the fail-over directive from the first peer, the second peer takes over the connection, performing steps 31–34 and 39, if possible. If none of the peers can take over the connection, then the connection is dropped. Note that the fail-over directive is sent for a particular connection. Any new connections and other established connections are handled by the first choice in accordance with the fail-over policy. Note also that the presence of a larger number of permanency peers lowers the probability of all the systems in the cluster being down when a particular connection is set up, and therefore lowers the probability of that connection not being taken over by a peer, and instead being dropped.

The permanency peers snooping the connection cannot determine if the application actually read the received data since there was no output from the system of the application. This implies that, upon recovery/restart on another node, the application must be capable of deciding whether or not the data was received. Alternatively, the application may be completely immune from receiving duplicate data. In accordance with the implementation and the capability of the application (easily made part of the ownership declaration), such data may either be dropped (in which case, the application will request a re-send), or sent to the application (in which case, the application will determine if it is duplicate).

Data in the send queues of the IP or media layer are lost when a system crashes. Consequently, the permanency peers cannot snoop the data, since it has never left that system. However, this condition becomes important only if the application has recorded in its state that it sent data. To maintain output data consistency, the permanency peers to always keep at least one window of sent data, whether it is acknowledged or not. Thus, the application, upon restarting on the permanency peer, regenerates the data that was to be sent at the time of the crash, and verify that data against the data kept at the endpoint. This solution can be accomplished by utilising a suitable API.

Owner Recovery

Once a system crashes, the permanency peers handle the connections. If required, one of the other systems also handles ARP ownership for the crashed system. When the crashed system recovers it sends its ownership declaration, which prompts the current ARP owner to stop handling ARP requests and returns responsibility for ARP back to the crashed-and-now recovered system.

The ownership declaration also informs the peer systems listening for new connections on the binding to stop doing so, and the task of establishing new connections passes back to the owner. The other peer systems send an "owner recovery directive" to the owner with the list of bindings that are active with them. The owner must snoop these, but must not allow new connections for these bindings to be setup until these connections terminate. The owner is not selected by the fail-over policy when any of the other systems crash, since the owner will not have the connection setup information. This is because the other systems are handling the owner's bindings only because the owner has crashed. Thus, the owner does not re-acquire the connections that are already active when it comes back on line. Alternatively, a connection transfer mechanism may be used, if available, to transfer active connections from the peer back to the owner.

Alternative Embodiments

It will be appreciated that, although specific embodiments of the invention and their alternatives have been described herein for purposes of illustration, various modifications may be made without departing from the spirit and scope of the invention. In particular, although this document has been written with cluster of servers, routers, or other systems in mind, the invention can be used on any device which handles a network connection and requires redundancy. Further, although the preferred embodiment has been described using TCP/IP, other network protocols can also be supported.

In the preferred embodiment, a common IP address is shared among the servers of a cluster. The address(es) will be shared by all of the servers, as far as the client systems are concerned, due to the IP fail-over inherent in the present invention. As a result, the present invention may be modified to define the ownership as a combination of IP address(es) and port range(s). The same IP address ends up being on multiple servers as part of the failover but it could also be a standard setup for load balancing. The ARP address ownership would be separately specified in the ownership declaration. The ARP ownership is owned by a particular system at a given time.

While the present invention has been described in connection with the preferred embodiment thereof and certain alternatives, it will be understood that many additional modifications will be readily apparent to those of ordinary skill in the art, and this application is intended to cover any adaptations or variations thereof. Therefore, it is manifestly intended that this invention be limited only by the following claims and the equivalents thereof.

I claim:

1. A method by which a second system maintains connections for a failed first system, the second system and the first system being peers to one another, the method performed by the second system and comprising:

receiving ownership information from the first system on which an application is running, the ownership information indicating that the second system is to assume a connection of the first system upon failure of the first system;

prior to the first system having entered a failed state, snooping the connection from a client to the first system to use the application thereof, in order to maintain information regarding the connection as known by the first system;

determining that the first system is in the failed state; and in response to determining that the first system is in the failed state, assuming the connection for the first system in a peer-to-peer manner, wherein the snooping of the connection from the client to the first system enables the second system to assume the connection without losing the information regarding the connection as known by the first system, such that the client is unaware that the second system has assumed the connection for the first system.

2. The method of claim 1, wherein the ownership information is received when the second system is booted.

3. The method of claim 1, wherein the ownership information comprises: a fail over policy; a set of one or more IP addresses owned by the system; a range of port numbers; an application that is currently running on the system; a ARP ownership policy; a current protocol; a set of one or more MAC addresses tied to the IP address(es); and a cluster node ID.

4. The method of claim 1, wherein the first system and the second system solicit ownership information from each other.

5. The method of claim 1, further comprising determining that the first system has returned from the failed state to a normal state; and returning responsibility for new connections to the first system.

6. The method of claim 1, wherein the first system and the second system are within a cluster of systems.

7. The method of claim 1, wherein the connections are TCP connections.

8. The method of claim 1, further comprising snooping connection data of the first system.

9. The method of claim 1, further comprising continuing the application from the point at which the first system failed.

10. The method of claim 1, further comprising:

attempting by a third system to assume the connection; and sending from the third system to the second system a request to assume the connection.

11. A peer-to-peer system for maintaining a connection within a network, comprising:

means for broadcasting ownership information between a first system on which an application is running to at least a second system within the network, the first system and the second system being peers to one another, the ownership information indicating that the second system is to assume a connection of the first system by a client to use the application thereof, upon failure of the first system;

means for determining that the second system will assume the connection for the first system if the first system fails;

means for snooping by the second system prior to failure of the first system, packets sent to and received by the first system, so that the second system is able to maintain information regarding the connection as known by the first system;

means for determining that the first system is in a failed state;

means for continuing the application on the second system from the point at which the first system failed, the second system assuming the connection in a peer-to-peer manner, the snooping of the connection from the client to the first system enabling the second system to assume the connection without losing the information regarding the connection as known by the first system, such that the client is unaware that the second system has assumed the connection for the first system.

12. The system of claim 11, further comprising a means for broadcasting ownership information when each system is booted.

13. The system of claim 11, wherein the ownership information comprises:

a fail over policy;

a set of IP addresses owned by each system within the network;

a range of port numbers;

an application that is currently running on each system; a ARP ownership policy;

a current protocol;

a set of MAC addresses tied to the IP address(es); and a cluster node ID.

14. The system of claim 11, further comprising:

means for returning the first system from a failed state to a normal state; and means by which connection is regained by the first system from the second system.

15. An article for maintaining connections by a second system for a first system, the first system and the second system being peers to one another, comprising:

a computer-readable signal-bearing medium;

means in the medium for receiving ownership information of the first system by the second system, the ownership information indicating that the second system is to assume a connection of the first system by a client to use an application thereof, upon failure of the first system, means in the medium for snooping the connection by the second system prior to failure of the first system so that the second system is able to maintain information regarding the connection as known by the first system;

means in the medium for determining that the first system is in a failed state; and means in the medium for assuming the connection for the first system by the second system in a peer-to-peer manner, the snooping of the connection from the client to the first system enabling the second system to assume the connection without losing the information regarding the connection as known by the first system, such that the client is unaware that the second system has assumed the connection for the first system.

16. The article of claim 15, further including:

means in the medium for continuing an application on the second system from the point at which the first system failed.

17. The article of claim 15, wherein the ownership information of the first system is broadcast when the system is booted.

18. The article of claim 15, wherein the ownership information comprises:

a fail over policy;

a set of IP addresses owned by the first system; a range of port numbers;

an application that is currently running on the first system;

a ARP ownership policy;

a current protocol;

a set of MAC addresses tied to the IP address(es); and a cluster node ID.

19. The article of claim 15, further comprising:

means in the medium for determining that the first system has returned from a failed state to a normal state; and means in the medium for returning responsibility for connections to the first system.

* * * * *